US011490026B2

(12) United States Patent
Kim

(10) Patent No.: US 11,490,026 B2
(45) Date of Patent: Nov. 1, 2022

(54) ILLUMINATION CONTROL SYSTEM

(71) Applicant: Sun-Gu LEE, Ansan-si (KR)

(72) Inventor: Jin Goo Kim, Yeongtong-gu (KR)

(73) Assignee: Sun-Gu Lee, Ansan-si (KR)

( * ) Notice: Subject to any disclaimer, the term of this patent is extended or adjusted under 35 U.S.C. 154(b) by 14 days.

(21) Appl. No.: 17/260,864

(22) PCT Filed: Jul. 15, 2019

(86) PCT No.: PCT/KR2019/008713
§ 371 (c)(1),
(2) Date: Jan. 15, 2021

(87) PCT Pub. No.: WO2020/017850
PCT Pub. Date: Jan. 23, 2020

(65) Prior Publication Data
US 2021/0266448 A1 Aug. 26, 2021

(30) Foreign Application Priority Data

Jul. 16, 2018 (KR) .................. 10-2018-0082466

(51) Int. Cl.
*H04N 5/235* (2006.01)
*G06T 7/215* (2017.01)
(Continued)

(52) U.S. Cl.
CPC .......... *H04N 5/2354* (2013.01); *G06F 3/017* (2013.01); *G06T 3/0087* (2013.01); *G06T 7/215* (2017.01); *G06T 2207/10152* (2013.01)

(58) Field of Classification Search
CPC ..... H04N 5/2354; G06T 7/215; G06T 3/0087; G06T 2207/10152; G06F 3/017
(Continued)

(56) References Cited

U.S. PATENT DOCUMENTS

2012/0319596 A1* 12/2012 Nanahara ............. H05B 47/125
315/153
2013/0346229 A1* 12/2013 Martin .................. G06Q 40/00
705/35

(Continued)

FOREIGN PATENT DOCUMENTS

| KR | 10-0832519 B1 | 5/2008 |
|---|---|---|
| KR | 10-0958497 B1 | 5/2010 |

(Continued)

OTHER PUBLICATIONS

International Search Report for PCT/KR2019/008713 dated Oct. 18, 2019 [PCT/ISA/210].
(Continued)

*Primary Examiner* — Allen C Wong
(74) *Attorney, Agent, or Firm* — Sughrue Mion, PLLC

(57) ABSTRACT

Provided is an illumination control system including: an image capturing unit capturing an image in real time; a motion sensing unit sensing motion in the image and generating a notification; a communication unit receiving the image and the notification for transmission to outside, and receiving a control signal; a control unit receiving information on the image and the notification through the communication unit, analyzing the information, and transmitting the control signal for control; a light unit connected to the communication unit so that lights are controlled through the control signal; and a storage unit storing the information.

11 Claims, 4 Drawing Sheets

(51) Int. Cl.
*G06F 3/01* (2006.01)
*G06T 3/00* (2006.01)

(58) Field of Classification Search
USPC .......................................................... 348/36
See application file for complete search history.

(56) References Cited

U.S. PATENT DOCUMENTS

| | | | | |
|---|---|---|---|---|
| 2015/0138364 A1* | 5/2015 | Enomoto | ........... | H04N 5/23206 |
| | | | | 348/151 |
| 2016/0027262 A1* | 1/2016 | Skotty | .............. | G08B 13/19695 |
| | | | | 340/541 |
| 2020/0314980 A1* | 10/2020 | Van De Sluis | ........ | H05B 45/14 |

FOREIGN PATENT DOCUMENTS

| KR | 10-2012-0007732 A | 1/2012 |
|---|---|---|
| KR | 10-1271894 B1 | 6/2013 |
| KR | 10-1416175 B1 | 7/2014 |
| KR | 10-1453806 A | 10/2014 |
| KR | 10-1602212 B1 | 3/2016 |

OTHER PUBLICATIONS

Grant of Patent for KR 10-2018-0082466 dated Oct. 14, 2019.
Notification of Reason for Refusal for KR 10-2018-0082466 dated Jul. 9, 2019.

\* cited by examiner

ILLUMINATION CONTROL SYSTEM

CROSS REFERENCE TO RELATED APPLICATIONS

This application is a National Stage of International Application No. PCT/KR2019/008713, filed on Jul. 15, 2019, which claims priority from Korean Patent Application No. 10-2018-0082466, filed on Jul. 16 2018, the entire disclosures of which are incorporated herein by reference.

TECHNICAL FIELD

The present disclosure relates to an illumination control system. More particularly, the present disclosure relates to an illumination control system that captures and analyzes an image in real time so as to control lights depending on illumination.

BACKGROUND ART

In general, a light device installed in a relatively large place is automatically turned on only at night using a photoconductive element, such as a cadmium sulfide (CdS) cell, etc.

Such a method of turning on or off the light device by simply using the photoconductive element, such as the CdS cell, etc., controls the turning on and the turning off of the light device depending on day and night, but even when there is no moving object nearby, for example, motion of a person or a vehicle, all lamps of the light device remain always turned on at night, resulting in waste of power.

In addition, illuminances partially differ even in the same place, making the eyes of a person in the place feel more fatigued.

DOCUMENTS OF RELATED ART

Patent Documents (Patent Document 1) Korean Patent No. 10-1602212 (Invention Title: LAMP CONTROL SYSTEM OF ZIGBEE INTERFACING POWER OVERLAP METHOD, Applicant: JUNG HO TOTAL LIGHTING CORP., Registration Date: 4 Mar. 2016); and (Patent Document 2) Korean Patent No. 10-0832519 (Invention Title: LIGHTING CONTROL SYSTEM USING WIRELESS TAG AND METHOD THEREOF, Applicant: SDSYSTEM CO., LTD., Registration Date: 20 May 2008)

DISCLOSURE

Technical Problem

The present disclosure is directed to providing an illumination control system. More particularly, the present disclosure is directed to providing an illumination control system that captures and analyzes an image in real time so as to control lights depending on illumination.

Technical Solution

According to a first exemplary embodiment of the present disclosure, there is provided an illumination control system including: an image capturing unit capturing an image in real time; a motion sensing unit sensing motion in the image and generating a notification; a communication unit receiving the image and the notification for transmission to outside, and receiving a control signal; a control unit receiving information on the image and the notification through the communication unit, analyzing the information, and transmitting the control signal for control; a light unit connected to the communication unit so that lights are controlled through the control signal; and a storage unit storing the information.

In addition, the control unit may divide the image into regions and may compare illuminations of respective pixels in each of the regions for control.

In addition, the control unit may control the lights in accordance with illumination preset depending on a place in the image.

In addition, the control unit may control, on the basis of illumination of one particular region among the regions resulting from the division, illumination of the remaining regions.

In addition, the motion sensing unit may generate a plurality of the notifications that differ depending on gestures.

In addition, the image capturing unit may include an omnidirectional camera capturing a 360-degree omnidirectional image.

In addition, the communication unit, the control unit, and the storage unit may be configured as an external online system in a form of a cloud server, and data of the light unit, the image capturing unit, and the motion sensing unit may be received from the cloud server and may be processed.

In addition, the light unit may include the lights provided on a ceiling, a wall, and a floor of a place.

In addition, the control unit may turn on or off the lights depending on whether or not the notification of the motion sensing unit is received.

The system may further include a terminal, wherein a user may operate the terminal so that the control signal may be transmitted to the light unit through the communication unit to control the lights.

In addition, the terminal may be any one among a mobile phone, a tablet PC, a computer, and a remote control.

Advantageous Effects

According to the present disclosure, an image is captured and analyzed in real time so that lights are controlled depending on illumination, whereby uniform illumination in the same place is maintained and user eye fatigue may thus be reduced.

In addition, according to the present disclosure, motion of a person is sensed and lights are controlled depending on the sensed motion, thereby preventing waste of power.

BEST MODE

Figure 1:
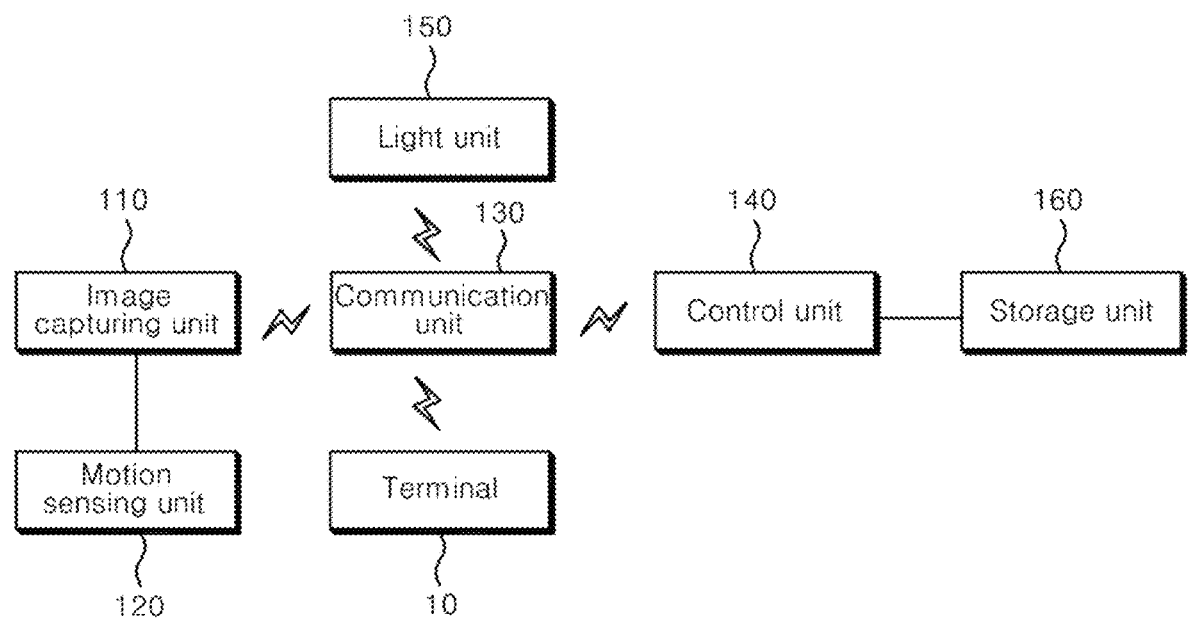
FIG. 1 is a diagram showing an illumination control system according to a first exemplary embodiment of the present disclosure.

Advantages and features of embodiments of the present disclosure, and methods to achieve the same will be apparent from the following embodiments that will be described in detail with reference to the accompanying drawings. However, the present disclosure may be embodied in many different forms, and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the description, the same reference numerals refer to same elements.

In the following description, when it is determined that a detailed description of a known function or element related with the present disclosure makes the gist of the present disclosure unclear, the detailed description will be omitted. Further, the terms described below defined considering functions in the embodiments of the present disclosure may vary depending on the intention of the user, the operator, or the custom. Therefore, the definitions should be based on the contents throughout this specification.

Hereinafter, exemplary embodiments of the present disclosure will be described with reference to the accompanying drawings.

FIG. 1 is a diagram showing an illumination control system according to a first exemplary embodiment of the present disclosure.

Referring to FIG. 1, an image capturing unit 110, a motion sensing unit 120, a communication unit 130, a control unit 140, a light unit 150, a storage unit 160, etc. may be included.

Figure 2:
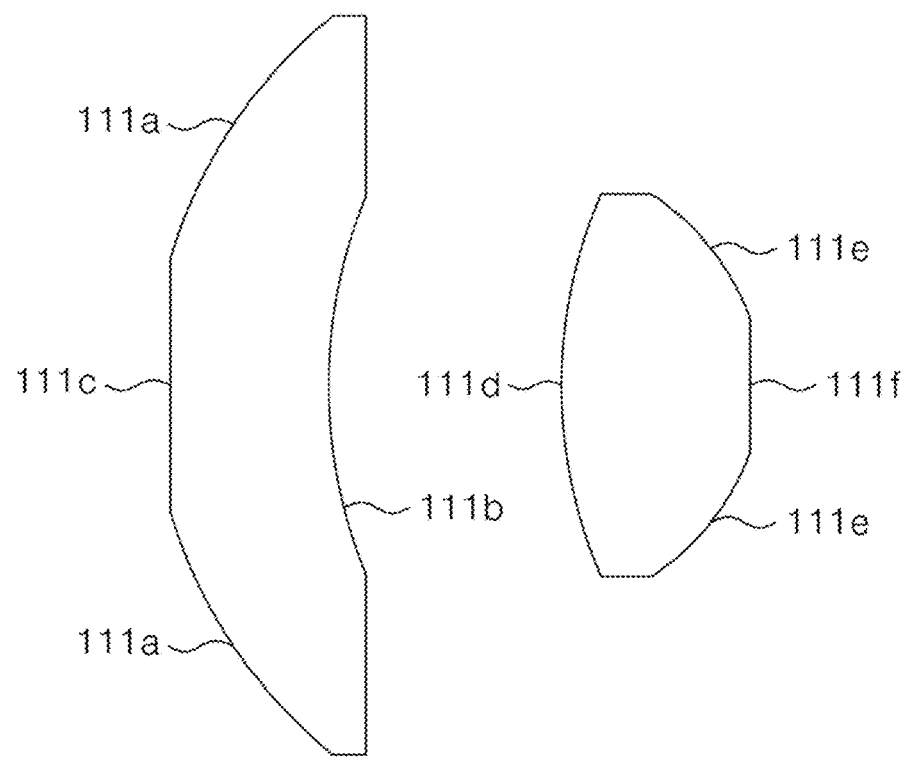
FIG. 2 is a diagram showing an omnidirectional lens of an omnidirectional camera according to the first exemplary embodiment of the present disclosure.
Figure 3:
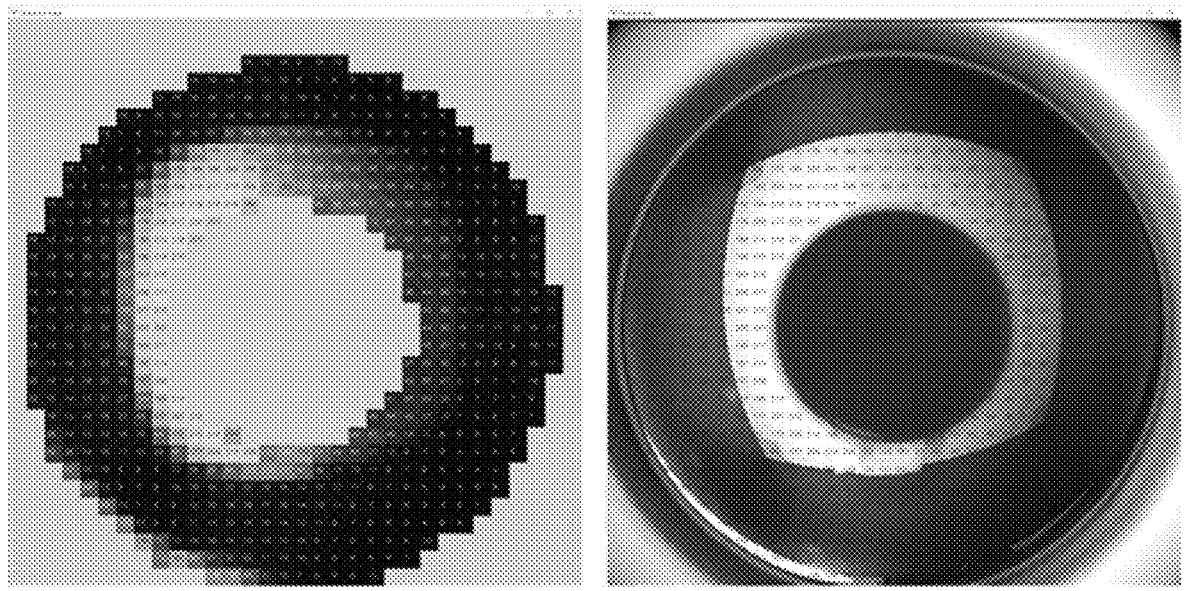
FIGS. 3 to 5 are diagrams showing examples of measuring illumination performed by an image capturing unit according to the first exemplary embodiment of the present disclosure.
Figure 4:
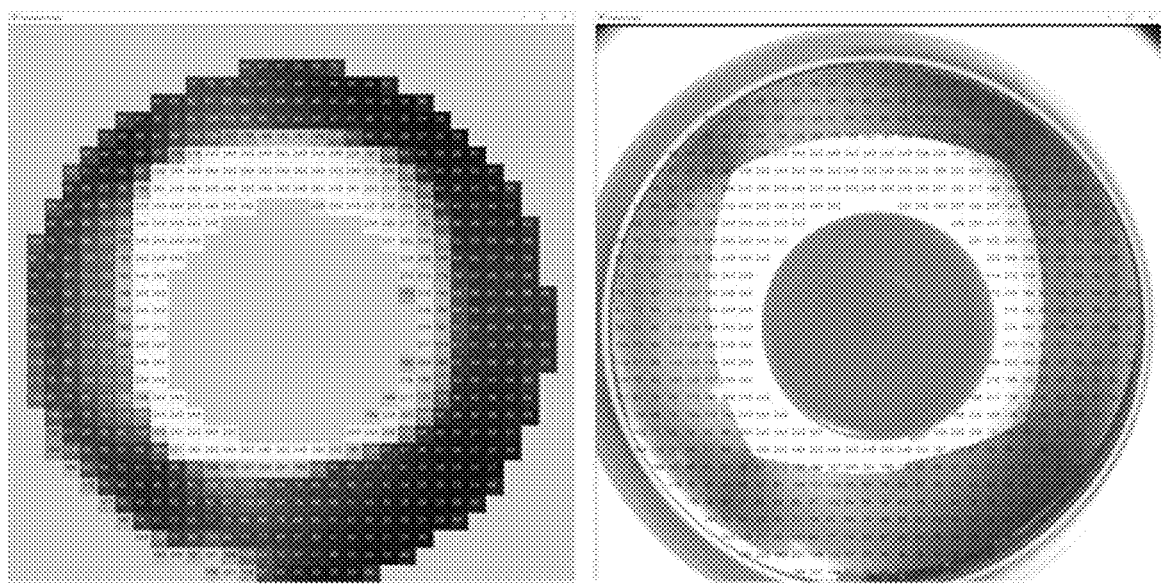
Figure 5:
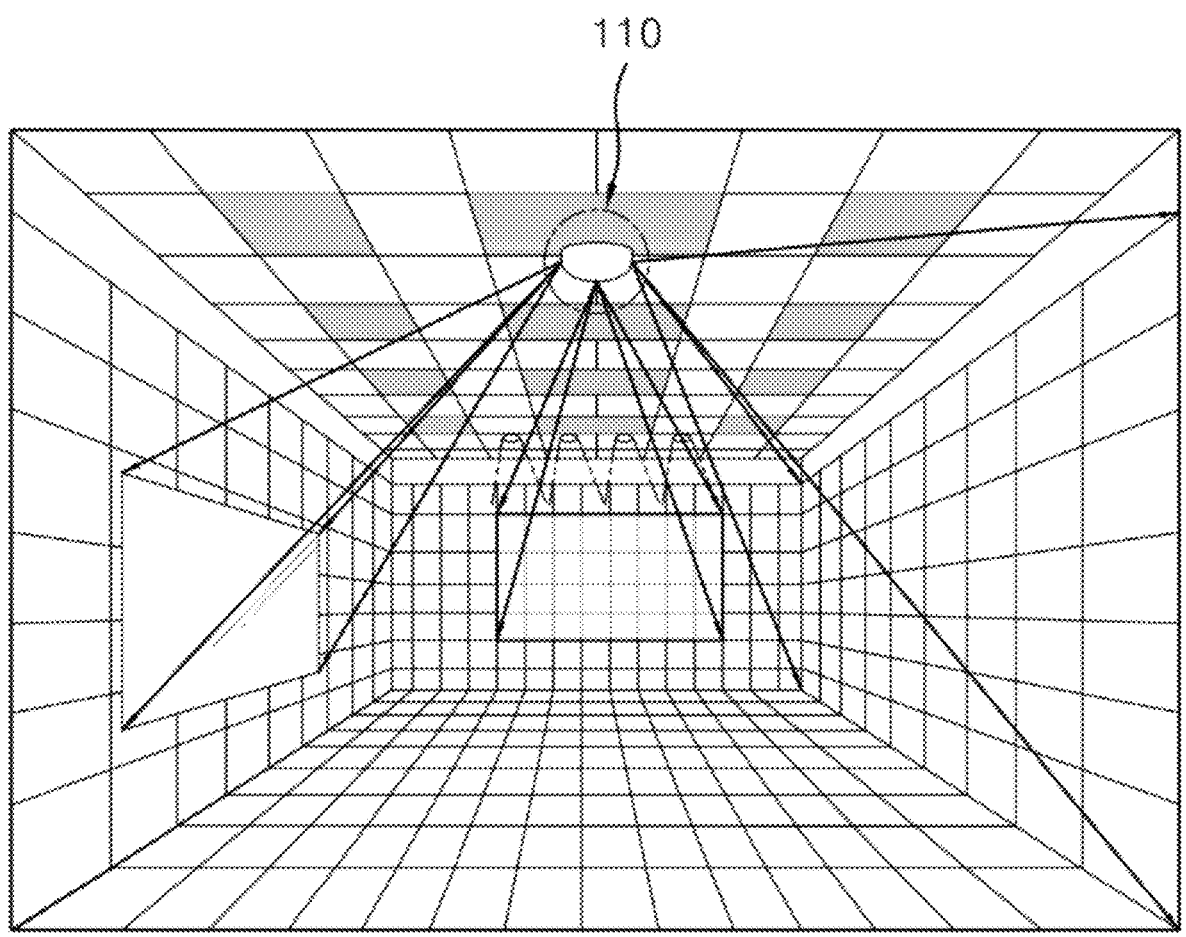

FIG. 2 is a diagram showing an omnidirectional lens of an omnidirectional camera according to the first exemplary embodiment of the present disclosure. FIGS. 3 to 5 are diagrams showing examples of measuring illumination performed by an image capturing unit according to the first exemplary embodiment of the present disclosure.

Referring to FIGS. 2 to 5, the image capturing unit 110 may include an omnidirectional camera 111, and may capture an image in real time.

Herein, the omnidirectional camera 111 may be provided with an aspherical lens that is any one among an omnidirectional lens, a mirror lens, and a fish-eye lens and may capture a 360-degree omnidirectional image.

For example, an omnidirectional lens module includes a first lens having a first surface and a second surface, wherein in the first surface, a first entrance surface 111a that is convex is formed, and in the second surface, a first exit surface 111b is formed, and in the center of the first entrance surface 111a, a first reflective surface 111c is formed.

Herein, the omnidirectional lens module includes a second lens having a first surface and a second surface, wherein in the first surface, a second entrance surface 111d is formed, and in the second surface, a second reflective surface 111e that is convex is formed, and in the center of the second reflective surface 111e, a second exit surface 111f is formed.

In addition, the first exit surface 111b is formed to be concave and the second entrance surface 111d is formed to be convex. A radius of curvature of the first exit surface 111b and a radius of curvature of the second entrance surface 111d are formed to be equal and are joined together. A radius of curvature of the first entrance surface 111a ranges from 21 mm to 23 mm. A radius of curvature of the second reflective surface 111e ranges from 10 mm to 12 mm. Both the radius of curvature of the first exit surface 111b and the radius of curvature of the second entrance surface 111d range from 29 mm to 31 mm so that a focal point is not at junction surfaces of the first lens and the second lens.

Herein, the image capturing unit 110 may have a range of measurement of 200 to 900 lux, and may perform measurement with division into 1024 pixels and division of a degree of illumination into levels 0 to 255.

The motion sensing unit 120 may sense motion of a person in the image captured by the image capturing unit 110, may generate a notification, and may transmit the notification to the control unit 140 through the communication unit 130.

Herein, the motion sensing unit 120 may generate different notifications depending on person's gestures.

For example, notifications may be generated in such a manner that when a person just walks with arms lowered, only a light at the position of the person is turned on, or when a person raises one arm to the sky, all the lights in the place are turned on, or when a person raises both arms to the sky, the lights are not turned on, thereby controlling all the lights without using other devices.

In addition, a user is able to set a particular gesture, and a change in lighting depending on the particular gesture. Thus, notifications may be generated such that even a person (for example, the elderly, the weak, the disabled, etc.) who has difficulty in making a particular gesture is able to set other gestures to be recognized so as to control the lights.

For example, a person having difficulty in using their arms may set gestures by using their neck, legs, etc., thereby controlling the lights.

The communication unit 130 may transmit the image and the notification received from the image capturing unit 110 and the motion sensing unit 120, respectively, to the outside, and may receive a control signal.

Herein, the communication unit 130 may transmit the image and the notification to the control unit 140, may receive a control signal, and may transmit the control signal to the light unit 150.

In addition, the communication unit 130 may be connected to the image capturing unit 110, the motion sensing unit 120, the control unit 140, and the light unit 150 in a wired or wireless manner so that the communication unit 130 may identify current operation states of the respective units through intercommunication.

For example, the communication unit 130 transmits and receives signals from each of the units, so that the communication unit 130 identifies failures of the units from which signals are not received, and takes measures.

In addition, the communication unit 130 may transmit information to a terminal 10 of the user according to a signal of the control unit 140.

The control unit 140 may receive information on the image and the notification through the communication unit 130, may analyze the same, and may transmit a control signal for control.

Herein, when the motion sensing unit 120 does not sense motion and the control unit 140 does not receive a notification, the control unit 140 transmits a turn-off control signal to the light unit 150 to turn off the lights. When the motion sensing unit 120 senses motion and the control unit 140 receives a notification, the control unit 140 transmits a turn-on control signal to the light unit 150 to turn on the lights.

In addition, the control unit 140 may divide the image into regions (for example, division into four regions, division into nine regions, etc.), and may compare illuminations of the respective pixels in each of the regions.

Specifically, the control unit 140 detects the image on a per-pixel basis through the omnidirectional camera 111, and may form the pixel-based images into pixel-based groups with a particular reference. Herein, an example of the particular reference may be illumination for determination.

Herein, a user may set a desired illumination depending on a place (for example, an office, a manufacturing plant, a laboratory, etc.), and the control unit 140 may identify the place in the image and may transmit a control signal to the light unit 150 according to the illumination preset by the user so as to control the lights, whereby illumination throughout the place may be controlled in one attempt.

In addition, the place in the image may be identified through particular equipment, desk arrangement, etc., or the user may set the place in advance.

Herein, on the basis of illumination of one particular region among the regions resulting from the division, the control unit 140 controls illumination of the remaining regions, so that illumination of all the regions may be set to illumination of the desired region.

In addition, on the basis of an average illumination of all the regions resulting from the division, the control unit 140 controls illumination of all the regions so as to reduce eye fatigue caused by non-uniform illumination in all the regions.

In another embodiment, a user may operate the terminal 10 so that a control signal is transmitted to the light unit 150 through the communication unit 130 to control the lights.

The user may operate the terminal 10 so that a turn-off control signal may be transmitted to the light unit 150 to turn off the lights or a turn-on control signal may be transmitted to the light unit 150 to turn on the lights.

The user may operate the terminal 10 to adjust a preset illumination and the control unit 140 may control the lights by transmitting a control signal to the light unit 150 according to the adjusted illumination.

Herein, a manager statistically manages an average value, a standard deviation, etc. of the amount of power consumed during a unit period that is a reference, for example, a monthly basis for accumulated power consumption of the lights. When it is repeatedly reported that the amount of power of the lights exceeds the value by a threshold value or more, it is estimated that a problem has occurred in the image capturing unit 110, the motion sensing unit 120, the communication unit 130, the light unit 150, etc. of the illumination control system. This fact may be used for detection of a faulty light, etc.

Specifically, according to the first exemplary embodiment, when the control unit computes a power consumption of the lights for the unit period, as shown in [Equation 1] below, an average of the amounts of power of the lights controlled by the light unit 150 is computed and set as a representative power consumption value. Then, the representative power consumption value is compared with power consumption values of the respective lights so as to derive data in which singularity occurs, thereby easily detecting a light estimated to have had a fault related to the amount of power.

$$\overline{W} = <W_x + W_x + \ldots + W_x YX \qquad \text{[Equation 1]}$$

Wherein,
$\overline{w}$: a representative power consumption value
$W_x$: an X-th power consumption value
x: the number of lights in the light unit In addition, as a second exemplary embodiment, when the control unit computes a power consumption value of any one of the lights for the unit period, as shown in [Equation 2] below, power consumption values transmitted within the light unit 150 are multiplied by respective sensing weights. Then, the resulting values are averaged, and the average is set as a representative power consumption value. The representative power consumption value is compared with power consumption data of the lights individually provided, and on the basis of data in which singularity occurs, a light estimated to have had a fault may be detected.

$$\overline{W} = <A_x W_x + A_x W_x + \ldots + A_x W_x YX \qquad \text{[Equation 2]}$$

$\overline{W}$: a representative power consumption value
$A_x$: a weight of an X-th power consumption value
$W_x$: an X-th power consumption value
x: the number of lights in the light unit In addition, the control unit 140 may compare a previous image and a current image to check whether the lights are controlled correctly. When the control is not performed, information on the region on which the control is not performed is transmitted to the terminal 10 of the user through the communication unit 130 so that the user is able to check the state of the lights in real time.

The light unit 150 is connected to the communication unit 130 so that the lights may be controlled through a control signal.

Herein, the light unit 150 receives the control signal transmitted from the control unit 140 through the communication unit 130 so as to individually control the lights in all the regions.

In addition, the light unit 150 includes the lights provided on a ceiling, a wall, and a floor of the place, providing an optimum illumination environment.

The storage unit 160 may store and keep the information on the image and the notification generated by the image capturing unit 110 and the motion sensing unit 120, respectively, and a signal, etc. generated by the control unit 140.

Herein, the storage unit 160 may include a cloud server, and may be connected to the Internet so that data is accessed and identified in real time. Through the cloud server, information in several spaces may be identified and controlled simultaneously.

In addition, another embodiment may be implemented as follows: the communication unit 130, the control unit 140, and the storage unit 160 of the system are configured as an external online system in the forms of a cloud server, and data of the light unit, the image capturing unit, and the motion sensing unit is received from the cloud server and is processed.

In this case, a communication unit, a control unit, and a storage unit are not implemented for lights provided in different places physically spaced apart from each other and the cloud server provides the control service, thereby improving user manageability and providing a stable service.

Hereinbelow, a processing method of the above-described illumination control system will be described in detail, wherein in the illumination control system, the image capturing unit captures an image, the motion sensing unit senses motion, the communication unit transmits information on the image and the notification to the control unit, the control unit analyzes the received information and transmits a control signal to the light unit through the communication unit, the light unit controls the lights, and the storage unit stores the information.

Figure 6:
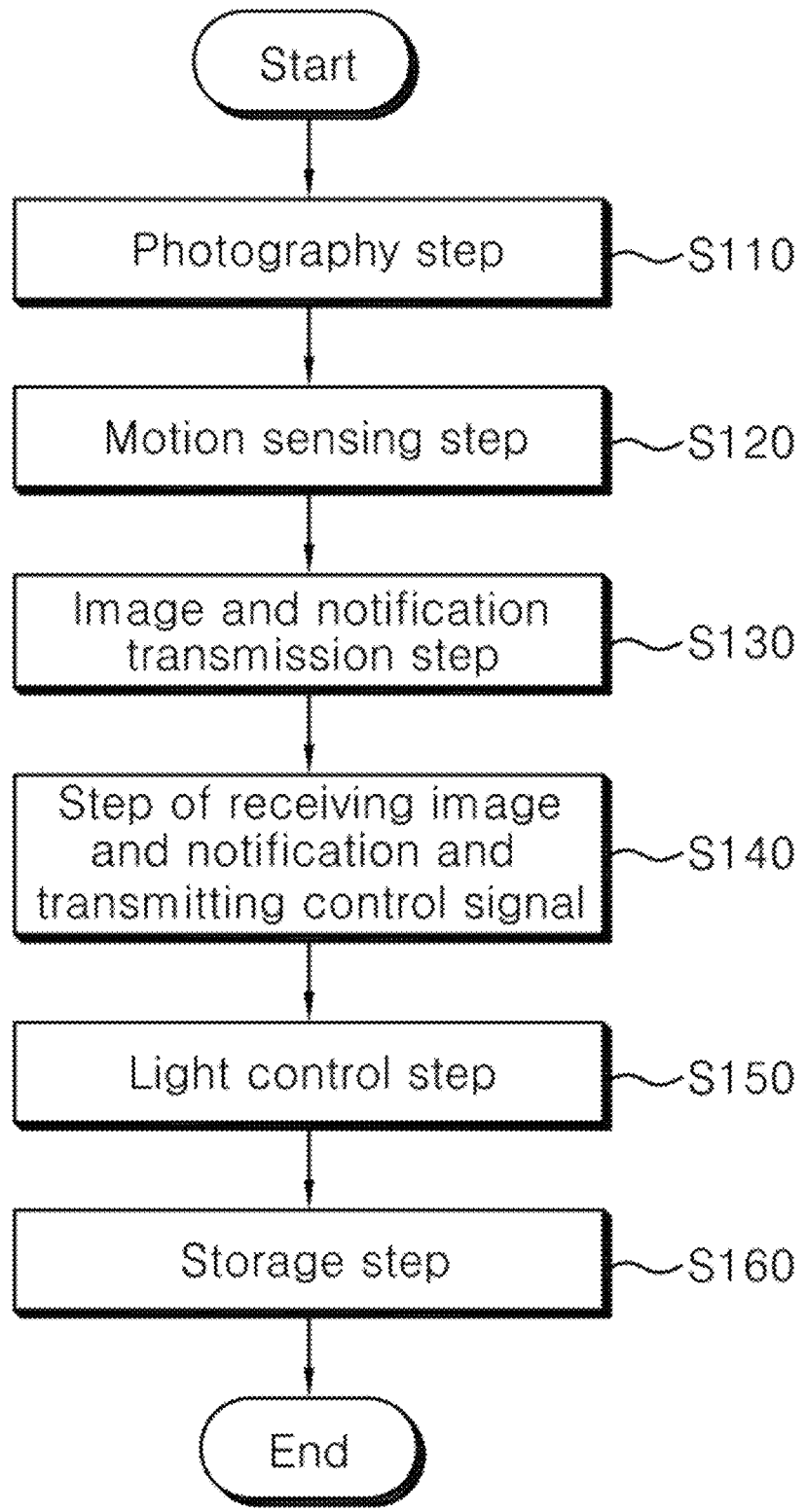
FIG. 6 is a step-by-step flowchart showing a processing method of an illumination control system according to a third exemplary embodiment of the present disclosure.

FIG. 6 is a step-by-step flowchart showing a processing method of an illumination control system according to a third exemplary embodiment of the present disclosure.

Referring to FIG. 6, an image capturing unit 110 may capture an image in real time (a photography step S110).

Herein, the image capturing unit 110 may include an omnidirectional camera 111, and may capture an image in real time.

Herein, the omnidirectional camera 111 may be provided with an aspherical lens that is any one among an omnidirectional lens, a mirror lens, and a fish-eye lens and may capture a 360-degree omnidirectional image.

For example, an omnidirectional lens module includes a first lens having a first surface and a second surface, wherein in the first surface, a first entrance surface 111a that is convex is formed, and in the second surface, a first exit surface 111b is formed, and in the center of the first entrance surface 111a, a first reflective surface 111c is formed.

Herein, the omnidirectional lens module includes a second lens having a first surface and a second surface, wherein in the first surface, a second entrance surface 111d is formed, and in the second surface, a second reflective surface 111e that is convex is formed, and in the center of the second reflective surface 111e, a second exit surface 111f is formed.

In addition, the first exit surface 111b is formed to be concave and the second entrance surface 111d is formed to be convex. A radius of curvature of the first exit surface 111b and a radius of curvature of the second entrance surface 111d are formed to be equal and are joined together. A radius of curvature of the first entrance surface 111a ranges from 21 mm to 23 mm. A radius of curvature of the second reflective surface 111e ranges from 10 mm to 12 mm. Both the radius of curvature of the first exit surface 111b and the radius of curvature of the second entrance surface 111d range from 29 mm to 31 mm so that a focal point is not at junction surfaces of the first lens and the second lens.

Herein, the image capturing unit 110 may have a range of measurement of 200 to 900 lux, and may perform measurement with division into 1024 pixels and division of a degree of illumination into levels 0 to 255.

The motion sensing unit 120 may sense motion of a person in the image captured by the image capturing unit 110, and may generate a notification (a motion sensing step S120).

Herein, the motion sensing unit 120 may generate different notifications depending on person's gestures.

For example, notifications may be generated in such a manner that when a person just walks with arms lowered, only a light at the position of the person is turned on, or when a person raises one arm to the sky, all the lights in the place are turned on, or when a person raises both arms to the sky, the lights are not turned on, thereby controlling all the lights without using other devices.

In addition, a user is able to set a particular gesture, and a change in lighting depending on the particular gesture. Thus, notifications may be generated such that even a person (for example, the elderly, the weak, the disabled, etc.) who has difficulty in making a particular gesture is able to set other gestures to be recognized so as to control the lights.

For example, a person having difficulty in using their arms may set gestures by using their neck, legs, etc., thereby controlling the lights.

The image capturing unit 110 and the motion sensing unit 120 may transmit the image and the notification, respectively, to the control unit 140 through the communication unit 130 (an image and notification transmission step S130).

Herein, the communication unit 130 may be connected to the image capturing unit 110, the motion sensing unit 120, the control unit 140, and the light unit 150 in a wired or wireless manner so that the communication unit 130 may identify current operation states of the respective units through intercommunication.

For example, the communication unit 130 transmits and receives signals from each of the units, so that the communication unit 130 identifies failures of the units from which signals are not received, and takes measures.

In addition, the communication unit 130 may transmit information to a terminal 10 of the user according to a signal of the control unit 140.

The control unit 140 may receive and analyze the image and the notification, and may transmit a control signal to the light unit 150 through the communication unit 130 (a step S140 of receiving an image and a notification and transmitting a control signal).

Herein, when the motion sensing unit 120 does not sense motion and the control unit 140 does not receive a notification, the control unit 140 transmits a turn-off control signal to the light unit 150 to turn off the lights. When the motion sensing unit 120 senses motion and the control unit 140 receives a notification, the control unit 140 transmits a turn-on control signal to the light unit 150 to turn on the lights.

In addition, the control unit 140 may divide the image into regions (for example, division into four regions, division into nine regions, etc.), and may compare illuminations of the respective pixels in each of the regions.

Specifically, the control unit 140 detects the image on a per-pixel basis through the omnidirectional camera 111, and may form the pixel-based images into pixel-based groups with a particular reference. Herein, an example of the particular reference may be illumination for determination.

Herein, a user may set a desired illumination depending on a place (for example, an office, a manufacturing plant, a laboratory, etc.), and the control unit 140 may identify the place in the image and may transmit a control signal to the light unit 150 according to the illumination preset by the user so as to control the lights, whereby illumination throughout the place may be controlled in one attempt.

In addition, the place in the image may be identified through particular equipment, desk arrangement, etc., or the user may set the place in advance.

Herein, on the basis of illumination of one particular region among the regions resulting from the division, the control unit 140 controls illumination of the remaining regions, so that illumination of all the regions may be set to illumination of the desired region.

In addition, on the basis of an average illumination of all the regions resulting from the division, the control unit 140 controls illumination of all the regions so as to reduce eye fatigue caused by non-uniform illumination in all the regions.

In another embodiment, a user may operate the terminal 10 so that a control signal is transmitted to the light unit 150 through the communication unit 130 to control the lights.

The user may operate the terminal 10 so that a turn-off control signal may be transmitted to the light unit 150 to turn off the lights or a turn-on control signal may be transmitted to the light unit 150 to turn on the lights.

The user may operate the terminal 10 to adjust a preset illumination and the control unit 140 may control the lights by transmitting a control signal to the light unit 150 according to the adjusted illumination.

Herein, a manager statistically manages an average value, a standard deviation, etc. of the amount of power consumed during a unit period that is a reference, for example, a monthly basis for accumulated power consumption of the lights. When it is repeatedly reported that the amount of power of the lights exceeds the value by a threshold value or more, it is estimated that a problem has occurred in the image capturing unit 110, the motion sensing unit 120, the communication unit 130, the light unit 150, etc. of the illumination control system. This fact may be used for detection of a faulty light, etc.

Specifically, according to the first exemplary embodiment, when the control unit computes a power consumption of the lights for the unit period, as shown in [Equation 1] below, an average of the amounts of power of the lights controlled by the light unit 1 is computed and set as a representative power consumption value. Then, the representative power consumption value is compared with power consumption values of the respective lights so as to derive data in which singularity occurs, thereby easily detecting a light estimated to have had a fault related to the amount of power.

$$\overline{W}=<W_x+W_x+\ldots+W_xYX \qquad \text{[Equation 1]}$$

Wherein,
$\overline{w}$: a representative power consumption value
$W_x$: an X-th power consumption value
x: the number of lights in the light unit In addition, as a second exemplary embodiment, when the control unit computes a power consumption value of any one of the lights for the unit period, as shown in [Equation 2] below, power consumption values transmitted within the light unit 4 are multiplied by respective sensing weights. Then, the resulting values are averaged, and the average is set as a representative power consumption value. The representative power consumption value is compared with power consumption data of the lights individually provided, and on the basis of data in which singularity occurs, a light estimated to have had a fault may be detected.

$$\overline{W}=<A_xW_x+A_xW_x+\ldots+A_xW_xYX \qquad \text{[Equation 2]}$$

$\overline{w}$: a representative power consumption value
$A_x$: a weight of an X-th power consumption value
$W_x$: an X-th power consumption value
x: the number of lights in the light unit The light unit 150 is connected to the communication unit 130 so that the lights may be controlled through a control signal (a light control step S150).

Herein, the light unit 150 receives the control signal transmitted from the control unit 140 through the communication unit 130 so as to individually control the lights in all the regions.

In addition, the light unit 150 includes the lights provided on a ceiling, a wall, and a floor of the place, providing an optimum illumination environment.

In addition, after the light control step (S150), the control unit 140 may compare a previous image and a current image to check whether the lights are controlled correctly. When the control is not performed, information on the region on which the control is not performed is transmitted to the terminal 10 of the user through the communication unit 130 so that the user is able to check the state of the lights in real time (a terminal transmission step).

The storage unit 160 may store and keep the information on the image and the notification generated by the image capturing unit 110 and the motion sensing unit 120, respectively, and a signal, etc. generated by the control unit 140 (a storage step S160).

Herein, the storage unit 160 may include a cloud server, and may be connected to the Internet so that data is accessed and identified in real time. Through the cloud server, information in several spaces may be identified and controlled simultaneously.

In addition, another embodiment may be implemented as follows: the communication unit 130, the control unit 140, and the storage unit 160 of the system are configured as an external online system in the forms of a cloud server, and data of the light unit, the image capturing unit, and the motion sensing unit is received from the cloud server and is processed.

In this case, a communication unit, a control unit, and a storage unit are not implemented for lights provided in different places physically spaced apart from each other and the cloud server provides the control service, thereby improving user manageability and providing a stable service.

In the illumination control system according to the embodiments of the present disclosure, since one camera captures a 360-degree omnidirectional image rather than using multiple cameras or sensors, the illumination control system is economical. Further, the illumination control system does not need to compute regions in which images captured by multiple cameras or sensors are overlapped, and does not need a controller for editing images captured by multiple cameras or sensors, which is efficient.

In addition, in the illumination control system according to the embodiments of the present disclosure, an image is captured and analyzed in real time so that lights are controlled depending on illumination, whereby uniform illumination in the same place is maintained and user eye fatigue may thus be reduced.

In addition, the illumination control system according to the embodiments of the present disclosure senses motion of a person and controls lights depending on the motion, so that waste of power is prevented.

Although various embodiments of the present disclosure have been described, the present disclosure is not necessarily limited thereto and those skilled in the art will understand that various substitutions, changes, and modifications may be made without departing from the scope of the present disclosure.

The invention claimed is:

1. An illumination control system, comprising:
an image capturing unit capturing an image in real time;
a motion sensing unit sensing motion in the image and generating a notification;
a communication unit receiving the image and the notification for transmission to outside, and receiving a control signal;
a control unit receiving information on the image and the notification through the communication unit, analyzing the information, and transmitting the control signal for control;
a plurality of light units connected to the communication unit so that lights are controlled through the control signal; and
a storage unit storing the information,
wherein the control unit computes a representative power consumption value which is calculated by dividing an entire power consumption amount of the plurality of light units by a number of the plurality of light units, and compares the representative power consumption value with a power consumption amount of the respective light unit so as to detect a faulty light unit.

2. The illumination control system of claim 1, wherein the control unit divides the image into regions and compares illuminations of respective pixels in each of the regions for control.

3. The illumination control system of claim 2, wherein the control unit controls the lights in accordance with illumination preset depending on a place in the image.

4. The illumination control system of claim 2, wherein the control unit controls, on the basis of illumination of one particular region among the regions resulting from the division, illumination of the remaining regions.

5. The illumination control system of claim 1, wherein the motion sensing unit generates a plurality of the notifications that differ depending on gestures.

6. The illumination control system of claim 1, wherein the image capturing unit comprises an omnidirectional camera capturing a 360-degree omnidirectional image.

7. The illumination control system of claim 1, wherein the communication unit, the control unit, and the storage unit are configured as an external online system in a form of a cloud server, and data of the plurality of light units, the image capturing unit, and the motion sensing unit is received from the cloud server and is processed.

8. The illumination control system of claim 1, wherein the plurality of light units comprises the lights provided on a ceiling, a wall, and a floor of a place.

9. The illumination control system of claim 1, wherein the control unit turns on or off the lights depending on whether or not the notification of the motion sensing unit is received.

10. The illumination control system of claim 1, further comprising: a terminal, wherein a user operates the terminal so that the control signal is transmitted to the plurality of light units through the communication unit to control the lights.

11. The illumination control system of claim 10, the terminal is any one among a mobile phone, a tablet PC, a computer, and a remote control.

* * * * *